3,239,579
COMPOSITIONS OF ALKENYL AROMATIC RESINS AND DIORGANOPOLYSILOXANES

Earnway A. Barber, Auburn, Bernard H. Tubbs, Midland, and Arthur F. Roche, Freeland, Mich., assignors to The Dow Chemical Company, Midland, Mich., a corporation of Delaware
No Drawing. Continuation of application Ser. No. 406,578, Jan. 27, 1954. This application Jan. 15, 1962, Ser. No. 166,363
12 Claims. (Cl. 260—827)

This application is a continuation of application Serial No. 406,578, filed January 27, 1954, now abandoned.

This invention concerns certain new thermoplastic compositions of matter comprising alkenyl aromatic resins and diorganopolysiloxane elastomers.

The new compositions are water resistant, possess excellent electrical properties even after exposure to moisture, are resistant to deterioration upon aging in the presence of air, light, heat, or oxygen, and can be molded to form articles having good mechanical properties such as impact strength and percent elongation. The new compositions can be molded by usual compression, injection molding or extrusion operations to form plastic articles suitable for a variety of purposes. The compositions are useful for making molded plastic articles having good electrical properties.

The new compositions are prepared by incorporating a minor amount of a non-liquid benzene-soluble diorganopolysiloxane containing in chemically combined form a plurality of siloxane units of the type $R_2SiO$ wherein each R is selected from the group consisting of the methyl and phenyl radicals, and in which siloxane at least 90 percent of the total R groups are methyl radicals, with a major amount of thermoplastic alkenyl aromatic resin such as polystyrene, or a copolymer of a major proportion of styrene and a minor proportion of alpha-methylstyrene.

As the alkenyl aromatic resin starting material there may be employed a thermoplastic polymer of at least one mono-alkenyl aromatic compound of the benzene series. Homopolymers of monovinyl aromatic hydrocarbons, or nuclear halogenated derivatives thereof, such as styrene, ortho-, meta- and para-vinyltoluene, vinylxylene, ar-ethylvinylbenzene, ar-chlorostyrene, or isopropylvinylbenzene, or copolymers of any two or more of such monovinyl aromatic compounds, or copolymers of a predominant proportion of at least one such monovinyl aromatic compound and from 1 to 35 percent by weight of an alpha-alkyl-alkenyl aromatic hydrocarbon such as alpha-methylstyrene, para-methyl alpha-methylstyrene, or alpha-ethylstyrene, are preferred.

The diorganopolysiloxanes to be employed in accordance with the present invention are non-liquid benzene-soluble gummy to dough-like diorganopolysiloxanes containing in chemically combined form a plurality of siloxane units having the structural formula $R_2SiO$ wherein each R is a member of the group consisting of the methyl and phenyl radicals, and in which siloxane at least 90 percent of the total R groups are methyl radicals. The polysiloxane may be one in which all of the siloxane units are $(CH_3)_2SiO$, or the siloxane may be a copolymer of dimethylsiloxane and a minor amount of any combination of the units $C_6H_5(CH_3)SiO$, or $(C_6H_5)_2SiO$. The diorganopolysiloxane elastomers contain a plurality, e.g. from 2,700 to 10,000, or more, of the above-mentioned siloxane units. The diorganopolysiloxanes are unvulcanized polymers and are completely soluble in benzene. They may be prepared in known ways such as by catalytic polymerization of suitable diorganosiloxanes employing a procedure similar to that described in United States Patent No. 2,541,137. The diorganopolysiloxanes may be used in admixture with, i.e. as a composition containing, a finely divided silica in amount corresponding to 50 percent by weight or less of the composition. The aforementioned patent describes a number of unvulcanized diorganopolysiloxanes and mixtures of such polymers and finely divided silica which are suitable as starting materials for making the compositions of the invention. The term "diorganopolysiloxane elastomer" used herein refers to the unvulcanized benzene-soluble polymers and copolymers of diorganosiloxanes just mentioned and compositions of such polymers including up to 50 percent by weight of a finely divided silica.

The alkenyl aromatic resin and the diorganopolysiloxane elastomer starting materials are usually employed in proportions corresponding to from 50 to 98, preferably from 85 to 98, percent by weight of the alkenyl aromatic resin and from 50 to 2, preferably from 15 to 2, percent of the diorganopolysiloxane elastomer.

The compositions are usually prepared by heat-plastifying a blend, or dry mix, of the granular alkenyl aromatic resin and the diorganopolysiloxane elastomer in the desired proportions and mechanically working the heated mixture to form a homogeneous composition. Mixing or compounding the ingredients with one another may be carried out in a Banbury mixer, or on heated compounding rolls, in known ways. Usually, the addition of a small amount of a liquid plasticizer having a boiling point above 200° C. such as n-butylstearate, soybean oil, or a white mineral oil, in proportions corresponding to from 0.5 to 5 percent by weight of the composition, is of advantage as an aid to incorporating the heat-plastified ingredients with one another. The liquid plasticizer may be added to the heat-plastified ingredients while mechanically working the same at elevated temperatures, or it may be incorporated with the alkenyl aromatic resin during formation of the same, e.g. by dissolving the liquid plasticizer in the monomeric alkenyl aromatic compound and polymerizing the latter. Small amounts of organic peroxides having decomposition temperatures above 95° C. such as benzoyl peroxide, di-(tertiary-butylperphthalate), tertiary - butylpercaprylate, or tertiary-butylperbenzoate, may also advantageously be added to the heat-plastified mixture of ingredients, while mechanically working the same, in amount corresponding to from 0.01 to 0.5 percent by weight of the composition. It may be mentioned that a peroxy compound is advantageously added to the composition after the heat-plastified alkenyl aromatic resin and the diorganopolysiloxane elastomer have been mechanically worked in admixture with one another to produce a substantially uniform composition, then further working the heated mixture to uniformly mix the per-oxy compound with the composition. The addition of a per-oxy compound, e.g. tertiary-butylperbenzoate, to a diorganopolysiloxane elastomer and heating at elevated temperatures usually results in vulcanization or cross-linking of the siloxane and may cause the formation of a non-uniform composition by cross-linking of the siloxane elastomer when the peroxy compound is added prior to intimately incorporating the polymeric ingredients with one another.

In a preferred practice, the alkenyl aromatic resin is heat-plastified, e.g. by milling on heated compounding rolls, or by heating and kneading in a Banbury mixer. The diorganopolysiloxane elastomer is added in the desired proportion. The mixture is mechanically worked at temperatures between 150° and 250° C. to incorporate the ingredients with one another and produce a homogeneous or substantially uniform composition. Usually, mechanical working of the mixture on heated rolls, or by kneading in a Banbury mixer, for a time of from 3 to 15 minutes is sufficient to result in the formation of a uniform composition, although mechanical working of the mixture may be continued for longer periods of time. The milling or kneading operations should not be continued for prolonged periods of time such as to cause deterioration or excessive breakdown of the alkenyl aromatic resin. The composition is usually removed from the rolls or mixer and cooled or allowed to cool to room temperature or thereabout, then cut or ground to a granular form suitable for molding. In an alternate procedure the heat-plastified composition may be sheeted out, or fed to a plastics extruder and formed into thin bands, sheets, ribbons, or rods, then cooled and cut or ground to a granular form. Small amounts of dyes, pigments, or other coloring agents may be incorporated with the composition, together with a liquid plasticizing agent such as n-butylstearate, soybean oil, or a white mineral oil, as previously mentioned.

The following examples illustrate ways in which the principle of the invention has been applied but are not to be construed as limiting its scope.

EXAMPLE 1

A charge of 1440 grams of molding grade polystyrene containing one percent by weight of white mineral oil as lubricant was heat-plastified by kneading in a Banbury type laboratory mixer at a temperature of 162° C. Thirty grams of a batch of a diorganopolysiloxane elastomer, comprising an intimate mixture of 100 parts by weight of a dough-like non-flowing benzene-soluble dimethylpolysiloxane and 35 parts of finely divided "fume" silica, i.e. silica prepared by burning silicon tetrachloride and condensing the vaporized $SiO_2$, was added and mixed with the heat-plastified polystyrene. Thereafter, 30 grams of butyl stearate was added and the resulting mixture kneaded for a period of 6 minutes, then removed from the mixer and allowed to cool to room temperature. It was crushed to a granular form suitable for molding. Portions of the composition were injection molded to form test bars of ⅛ x ½ inch rectangular cross section. These test bars were used to determine the tensile strength, percent elongation and impact strength values for the composition. The procedure for determining tensile strength and percent elongation was similar to that described in ASTM D638–44T, and the procedure followed in measuring impact strength was similar to that described in ASTM D256–43T. Other molded test pieces were used to determine under the action of an alternating current having a frequency of $10^6$ cycles per second the dielectric constant and the percent power factor in accordance with procedure described in ASTM D150–44T. The dielectric constant and percent power factor were determined on test pieces after conditioning in air at 25° C. and 50 percent relative humidity for 24 hours, and on test pieces after immersion in water at 25° C. for 24, 48 and 168 hours, respectively. The composition had the properties given in Table I.

*Table I*

| Test No. | Mechanical Properties | | | |
|---|---|---|---|---|
| 1 | Tensile Strength, lbs./sq. in. | | | 5,140 |
| 2 | Elongation, percent | | | 14 |
| 3 | Notched Impact Strength, ft.-lbs. | | | 0.91 |

| | Electrical Properties | | | |
|---|---|---|---|---|
| | Conditioning | Frequency, cycles/sec. | Dielectric Constant | Percent Power Factor |
| 4 | 24 Hrs. in air | $10^6$ | 2.52 | 0.01 |
| 5 | 24 Hrs. in $H_2O$ | $10^6$ | 2.53 | 0.05 |
| 6 | 48 Hrs. in $H_2O$ | $10^6$ | 2.54 | 0.07 |
| 7 | 168 Hrs. in $H_2O$ | $10^6$ | 2.54 | 0.08 |

EXAMPLE 2

A charge of 288 grams of polystyrene was heat-plastified by milling the same on a pair of 3-inch diameter by 8 inches long internally steam heated laboratory rolls. One of the rolls was heated at a temperature of 240° F. and the other roll was heated at a temperature of 300° F. After heat-plastifying the polystyrene on the rolls, 12 grams of the batch of the diorganopolysiloxane described in Example 1 was added. The resulting mixture was milled on the heated rolls for a period of 6 minutes, then removed and allowed to cool to room temperature. It was crushed to a granular form suitable for molding. Molded test bars were prepared from the composition and tested as described in Example 1. The composition had the properties:

Tensile strength, lbs./sq. in. _____ 5380
Elongation, percent _____ 7.4
Notched impact strength, ft.-lb. _____ 0.89
Dielectric constant (initial) _____ 2.59
Power factor (initial), percent _____ 0.05
Dielectric constant (after 120 hrs. in $H_2O$) _____ 2.61
Power factor (after 120 hrs. in $H_2O$), percent ____ 0.10

EXAMPLE 3

A charge of 147 grams of molding grade polystyrene containing one percent by weight of white mineral oil as lubricant was heat-plastified by milling the same on the heated laboratory rolls described in Example 2. Thereafter, 147 grams of the batch of the diorganopolysiloxane described in Example 1, and 6 grams of butyl stearate was added. The resulting mixture was milled on the rolls heated at temperatures of 240° and 300° F., respectively, for 6 minutes, then removed and cooled to room temperature. It was crushed to a granular form. Molded test pieces of the composition were tested as described in Example 1. The composition had the properties:

Tensile strength, lbs./sq. in. _____ 480
Elongation, percent _____ 2.3
Notched impact strength, ft.-lb. _____ 0.74
Dielectric constant (initial) _____ 2.67
Power factor (initial), percent _____ 0.14
Dielectric constant (after 120 hrs. in $H_2O$) _____ 2.91
Power factor (after 120 hrs. in $H_2O$), percent ____ 0.22

EXAMPLE 4

In each of a series of experiments a portion of a batch of molding grade polystyrene in amount as stated in the following table was heat-plastified by milling the same on the laboratory rolls described in Example 2, while heating one of the rolls at a temperature of 280° F. and the other roll at a temperature of 320° F. After heat-plastifying the polystyrene on the rolls, a portion of a batch of a diorganopolysiloxane elastomer, comprising an intimate mixture of 100 parts by weight of a dough-like non-flowing benzene-soluble dimethylpolysiloxane and 45 parts of finely divided trimethylchlorosiloxane-treated fume silica, was added together with butylstearate, in proportions as stated in the table. The resulting mixture was compounded on the heated rolls for 6 minutes, then removed and cooled to room temperature. The composition was crushed to a granular form suitable for molding. Molded test pieces of the composition were tested by procedure similar to those described in Example 1. Table II identifies each composition and gives the proportions in percent by weight of the ingredients used in preparing the same. The table also gives the properties for each composition. The percent power factor was determined on molded test pieces of each composition after conditioning in air at 25° C. and 50 percent relative humidity for 24 hours.

Table II

| Run No. | Starting Materials | | | Product | | | |
|---|---|---|---|---|---|---|---|
| | Polystyrene, percent | Silicone Rubber, percent | Butyl Stearate, percent | Tensile Strength, lbs./sq. in. | Notched Impact Strength, ft.-lbs. | Elongation, percent | Power Factor, percent |
| 1 | 93 | 5 | 2 | 4,290 | 1.0 | 24.3 | 0.04 |
| 2 | 88 | 10 | 2 | 3,490 | 0.6 | 29.1 | 0.04 |
| 3 | 83 | 15 | 2 | 2,580 | 0.4 | 5.3 | 0.05 |

EXAMPLE 5

In each of a series of experiments, 300 grams of a composition comprising polystyrene, a diorganopolysiloxanes elastomer and n-butyl stearate in proportions as stated in the following table was prepared by procedure similar to that described in Example 2. The polystyrene employed in the experiments was in the form of molding granules and contained one percent by weight of white mineral oil as lubricant. The diorganopolysiloxane elastomer was an intimate mixture of 100 parts by weight of a benzene-soluble gummy copolymer of 95 mole percent dimethylsiloxane and 5 mole percent phenylmethylsiloxane, and 30 parts of Santocel C (a finely divided silica gel substantially free from sodium sulfate). After milling the ingredients with one another on the heated laboratory rolls for a time of approximately six minutes, the composition was removed and allowed to cool to room temperature. Molded test bars of the composition were tested by procedure similar to those described in Example 1. Table III identifies each composition by giving the proportion of ingredients in percent by weight from which it was prepared. The table also gives the properties for each composition. The percent power factor was determined on molded test pieces after conditioning in air at 25° C. and 50 percent relative humidity for 24 hours.

Table III

| Run No. | Starting Materials | | | Product | | | |
|---|---|---|---|---|---|---|---|
| | Polystyrene, percent | Silicone Rubber, percent | Butyl Stearate, percent | Tensile Strength, lbs./sq. in. | Notched Impact Strength, ft.-lbs. | Elongation, percent | Power Factor, percent |
| 1 | 93 | 5 | 2 | 4,060 | 0.8 | 22.4 | 0.05 |
| 2 | 88 | 10 | 2 | 3,280 | 0.5 | 19.4 | 0.07 |
| 3 | 83 | 15 | 2 | 2,240 | 0.5 | 8.4 | 0.06 |

EXAMPLE 6

A charge of 285 grams of polystyrene having a viscosity characteristic (10 percent by weight solution in toluene) of 60 centipoises at 25° C. was heat-plastified by milling the same on the laboratory rolls described in Example 2, heated at 240° F. and 300° F., respectively. Fifteen grams of a benzene-soluble gummy polyorganosiloxane consisting of a copolymer of 95 mole percent dimethylsiloxane and 5 mole percent phenylmethylsiloxane was added thereto. The mixture was compounded on the heated rolls for a period of six minutes, then removed and allowed to cool to room temperature. Molded test bars of the composition were tested as described in Example 1. The composition had the properties:

Tensile strength, lbs./sq. in. _____ 5030
Elongation, percent _____ 9.8
Notched impact strength, ft.-lb. _____ 0.54
Dielectric constant (initial) _____ 2.36
Power factor (initial), percent _____ 0.03
Power factor (after 120 hrs. in H$_2$O), percent ____ 0.05

EXAMPLE 7

A charge of 89.2 pounds of a batch of molding grade polystyrene containing one percent by weight of white mineral oil was heat-plastified and kneaded in a Banbury mixer. A charge of 7.6 pounds of a concentrate, previously prepared by compounding equal parts by weight of the batch of polystyrene and a diorganopolysiloxane elastomer composed of an intimate mixture of 100 parts by weight of a non-flowing benzene-soluble dough-like dimethylpolysiloxane and 35 parts by weight of fume silica with one another at temperatures between 350° and 370° F. for a period of approximately 8 minutes, was added to the heat-plastified polystyrene in the Banbury mixer. The mixture was kneaded at temperatures between 150° and 190° C. for a period of 11 minutes while adding 0.1 pound of color pigment and 1.9 pounds of n-butyl stearate, after which the mixture was kneaded for 5 minutes longer, than fed to a plastics extruder and extruded, cooled and cut to a granular form suitable for molding. A portion of the composition was injection molded to form test bars ⅛ x ½ inch cross section by 4 inches long. The test bars were used to determine tensile strength, percent elongation and impact strength values for the composition by procedures as described in Example 1. Other molded test pieces were used to determine the heat distortion temperature by a procedure of Heirholzer and Boyer ASTM Bulletin No. 134 of May 1945, and to determine under the action of an alternating current having a frequency of $10^6$ cycles per second the dielectric constant and the percent power factor in accordance with procedures described in ASTM D150–44T. The dielectric constant and percent power factor were determined on test pieces after conditioning in air of 50 percent relative humidity at 25° C. for 24 hours and on test pieces after immersion in water at 25° C. for a period of time as indicated in the following table. The composition had the properties given in Table IV.

Table IV

| Test No. | Mechanical Properties | |
|---|---|---|
| 1 | Tensile Strength, lbs./sq. in. | 4,225 |
| 2 | Notched Impact Strength, ft.-lbs. | 0.78 |
| 3 | Elongation, percent | 21.6 |
| 4 | Heat Distortion Temp., ° C. | 74 |

| | Electrical Properties | | | |
|---|---|---|---|---|
| | Frequency, cycles/sec. | Immersion Time, Hrs. | Dielectric Constant | Percent Power Factor |
| 5 | $10^6$ | 0 | 2.54 | 0.04 |
| 6 | $10^6$ | 72 | 2.54 | 0.08 |
| 7 | $10^6$ | 120 | 2.55 | 0.08 |
| 8 | $10^6$ | 168 | 2.55 | 0.09 |

EXAMPLE 8

A charge of 288 grams of polyvinyltoluene, prepared by polymerizing a mixture of approximately 65 percent by weight of meta-vinyltoluene and 35 percent para-vinyltoluene in bulk, was heat-plastified by milling the same on the laboratory rolls heated at temperatures of 240° F. and 320° F., respectively, described in Example 2. Twelve grams of a batch of a diorganopolysiloxane elastomer composed of an intimate mixture of 100 parts by weight of a non-flowing benzene-soluble dough-like dimethylpolysiloxane and 35 parts of fume silica, was added. The mixture was compounded on the heated rolls for 6 minutes, then removed and allowed to cool. Molded test pieces of the composition were tested as described in Example 1. Other molded test pieces were used to determine the dielectric constant and percent power factor under the action of an alternating current having a frequency of $10^5$ cycles per second by procedures similar to those described in ASTM D150-44T. The dielectric constant and power factor were determined on test pieces after conditioning in air of 50 percent relative humidity at 25° C. for 24 hours and after immersion in water at 25° C. for 120 hours. The composition had the properties:

| | |
|---|---:|
| Tensile strength, lbs./sq. in. | 4250 |
| Elongation, percent | 16.4 |
| Notched impact strength, ft.-lb. | 0.98 |
| Dielectric constant (initial) | 2.49 |
| Power factor (initial), percent | 0.06 |
| Dielectric constant (after 120 hrs. in $H_2O$) | 2.54 |
| Power factor (after 120 hrs. in $H_2O$), percent | 0.10 |

EXAMPLE 9

A charge of 288 grams of copolymer of 85 percent styrene and 15 percent alpha-methylstyrene was heat-plastified by milling on the laboratory rolls heated at 240° F. and 320° F., respectively, described in Example 2. Twelve grams of the batch of the diorganopolysiloxane elastomer described in Example 8 were added and the mixture compounded on the heated rolls for 6 minutes, then removed and allowed to cool. Molded test pieces of the composition were tested by procedures as described in Example 1. The composition had the properties:

| | |
|---|---:|
| Tensile strength, lbs./sq. in. | 4380 |
| Elongation, percent | 14.6 |
| Notched impact strength, ft.-lb. | 0.56 |
| Dielectric constant (initial) | 2.51 |
| Power factor (initial), percent | 0.03 |
| Dielectric constant (after 120 hrs. in $H_2O$) | 2.55 |
| Power factor (after 120 hrs. in $H_2O$), percent | 0.04 |

EXAMPLE 10

A charge of 288 grams of poly-ar-chlorostyrene, prepared by polymerizing a mixture of approximately 50 percent by weight of para-chlorostyrene and 50 percent ortho-chlorostyrene in bulk, was heat-plastified by milling on the laboratory rolls heated at a temperature of 280° F. and 398° F., respectively, described in Example 2. Twelve grams of the batch of the diorganosiloxane elastomer described in Example 8 was added. The mixture was compounded on the heated rolls for 6 minutes, then removed and allowed to cool. Molded test pieces of the composition were tested by procedures as described in Example 1. The composition had the properties:

| | |
|---|---:|
| Tensile strength, lbs./sq. in | 4640 |
| Elongation, percent | 13.8 |
| Notched impact strength, ft.-lb | 0.47 |
| Dielectric constant (initial) | 2.67 |
| Power factor (initial), percent | 0.07 |
| Dielectric constant (after 120 hrs. in $H_2O$) | 2.69 |
| Power factor (after 120 hrs. in $H_2O$), percent | 0.13 |

We claim:

1. A thermoplastic composition consisting essentially of an intimate mixture of from 50 to 98 percent by weight of at least one alkenyl aromatic resin selected from the group consisting of (a) homopolymers and copolymers of said monovinyl aromatic compounds with each other and (b) copolymers of from 65 to 99 percent by weight of at least one such monovinyl aromatic compound of the benzene series and from 35 to 1 percent of an alkenyl aromatic hydrocarbon selected from the group consisting of alpha-methylstyrene, para-methyl-alpha-methylstyrene and alpha-ethylstyrene, and from 50 to 2 percent by weight of a non-liquid benzene-soluble diorganopolysiloxane elastomer in which the siloxane units are of the type $R_2SiO$, wherein each R is selected from the group consisting of the methyl and phenyl radicals at least 90 percent of the total R groups in the siloxane being methyl radicals, and said elastomer containing in chemically combined form a plurality of the siloxane units.

2. A composition as claimed in claim 1, wherein the alkenyl aromatic resin is a copolymer of at least 65 percent by weight of styrene and a lesser amount of alpha-methylstyrene.

3. A composition as claimed in claim 1, wherein the alkenyl aromatic resin is a homopolymer of vinyltoluene.

4. A composition as claimed in claim 1, wherein the alkenyl aromatic resin is a homopolymer of ar-chlorostyrene.

5. A composition consisting essentially of an intimate mixture of from 85 to 98 percent by weight of at least one alkenyl aromatic resin selected from the group consisting of (a) homopolymers of monovinyl aromatic compounds selected from the group consisting of monovinyl aromatic hydrocarbons of the benzene series and nuclear halogenated derivatives thereof, and copolymers of said monovinyl aromatic compounds with each other, and (b) copolymers of from 65 to 99 percent by weight of at least one such monovinyl aromatic compound of the benzene series and from 35 to 1 percent of an alkenyl aromatic hydrocarbon which is a member of the group consisting of alpha-methylstyrene, para-methyl-alpha-methylstyrene and alpha-ethylstyrene, and from 15 to 2 percent by weight of a non-liquid benzene-soluble diorgano-polysiloxane elastomer in which the siloxane units are of the type $R_2SiO$, wherein each R is selected from the group consisting of the methyl and phenyl radicals, at least 90 percent of the total R groups in the siloxane being methyl radicals and said elastomer containing in chemically combined form between 2,700 and 10,000 of the siloxane units.

6. A composition as claimed in claim 5, wherein the alkenyl aromatic resin is a copolymer of at least 65 percent by weight of styrene and a lesser amount of alpha-methylstyrene.

7. A composition as claimed in claim 5, wherein the alkenyl aromatic resin is a homopolymer of vinyltoluene and the diorganopolysiloxane elastomer is dimethylpolysiloxane.

8. A composition as claimed in claim 5, wherein the alkenyl aromatic resin is a homoplymer of ar-chlorostyrene and the diorganopolysiloxane elastomer is dimethylpolysiloxane.

9. A composition as claimed in claim 5, wherein the alkenyl aromatic resin is polystyrene and the diorganopolysiloxane elastomer is a coplymer of at least 90 mole percent of dimethylsiloxane and a lesser mole percent of phenylmethylsiloxane.

10. A method of making a thermoplastic composition consisting essentially of an alkenyl aromatic resin and a diorganopolysiloxane elastomer, which method consists in heat-plastifying and mechanically working in admixture with one another at a temperature between 150° and 250° C., (1) from 50 to 98 parts by weight of at least one thermoplastic alkenyl aromatic resin selected from the group consisting of (a) homopolymers of monovinyl aromatic compounds selected from the group consisting of monovinyl aromatic hydrocarbons of the benzene series and nuclear halogenated derivatives thereof, and copolymers of said monovinyl aromatic compounds with each other, and (b) copolymers of from 65 to 99 percent by weight of at least one such monovinyl aromatic compound selected from the group consisting of monovinyl aromatic hydrocarbons of the benzene series, and nuclear halogenated derivatives thereof, and from 35 to 1 percent of an alkenyl aromatic hydrocarbon which is a member of the group consisting of alpha-methyl styrene, para-methyl-alpha-methylstyrene and alpha-ethylstyrene, and (2) from 50 to 2 parts by weight of a non-liquid benzene-soluble diorganopolysiloxane elastomer in which the siloxane units are of the type $R_2SiO$, wherein each R is selected from the group consisting of the methyl and phenyl radicals, at least 90 percent of the total R groups in the siloxane being methyl radicals, and said elastomer containing in chemically combined form a plurality of the siloxane units.

11. A thermoplastic composition consisting essentially of an intimate mixture of from 50 to 98 percent by weight of polystyrene and from 50 to 2 percent by weight of a non-liquid benzene-soluble diorganopolysiloxane elastomer in which the siloxane units are of the type $R_2SiO$, wherein each R is selected from the group consisting of the methyl and phenyl radicals at least 90 percent of the total R groups in the siloxane being methyl radicals, and said elastomer containing in chemically combined form a plurality of the siloxane units.

12. A composition consisting essentially of an intimate mixture of from 85 to 98 percent by weight of polystyrene and from 15 to 2 percent by weight of a non-liquid benzene-soluble dimethylpolysiloxane containing in chemically combined form between 2,700 and 10,000 of the siloxane units.

References Cited by the Examiner

UNITED STATES PATENTS

| | | | |
|---|---|---|---|
| 2,258,218 | 10/1941 | Rochow | 260—827 |
| 2,541,137 | 2/1951 | Warrick | 260—37 |
| 2,635,060 | 4/1953 | Cheronis et al. | 260—827 |
| 2,698,314 | 12/1954 | Rust | 260—827 |
| 2,792,309 | 5/1957 | Teichmann | 260—827 |
| 2,888,424 | 5/1959 | Precopio et al. | 260—827 |
| 3,020,597 | 2/1962 | Smith-Johannsen | 260—2.5 |

OTHER REFERENCES

Boundy et al.: "Styrene," published by Reinbold Pub. Corp., New York (1952), pages 1188–1189.

MURRAY TILLMAN, *Primary Examiner.*

LEON J. BERCOVITZ, *Examiner.*